United States Patent [19]

Dahlin

[11] Patent Number: 4,831,885

[45] Date of Patent: May 23, 1989

[54] ACOUSTIC WAVE SUPRESSOR FOR CORIOLIS FLOW METER

[76] Inventor: Erik B. Dahlin, 1936 Arroyo Seco Dr., San Jose, Calif. 95125

[21] Appl. No.: 101,388

[22] Filed: Sep. 24, 1987

Related U.S. Application Data

[60] Division of Ser. No. 873,201, Jun. 11, 1986, which is a continuation-in-part of Ser. No. 856,939, Apr. 28, 1986, abandoned.

[51] Int. Cl.$^4$ ............................................. G01F 1/84
[52] U.S. Cl. .............................. 73/861.38; 73/272 R; 138/30; 181/206
[58] Field of Search ............... 73/199, 272 R, 861.05, 73/861.47, 861.38, 861.37, 707, 719; 138/26, 30; 181/206, 233, 234

[56] References Cited

U.S. PATENT DOCUMENTS

| | | | |
|---|---|---|---|
| 3,397,581 | 8/1968 | Bush | 73/719 |
| 4,011,757 | 3/1977 | Baatz | 73/199 |
| 4,263,812 | 4/1981 | Zeigner | 73/199 |
| 4,393,720 | 7/1983 | Tanahashi et al. | 73/861.05 |
| 4,393,724 | 7/1983 | Werkmann et al | 73/861.92 |
| 4,555,952 | 12/1985 | Jenkins | 73/861.47 |
| 4,570,745 | 2/1986 | Sparks et al. | 138/26 |

Primary Examiner—Herbert Goldstein
Attorney, Agent, or Firm—Ciotti & Murashige, Irell & Manella

[57] ABSTRACT

A Coriolis-type mass flowmeter in which the flow tube is vibrated at a resonance frequency approximately equal to the frequency for forced or natural vibration in a higher anti-symmetric mode, such as the second mode. In the preferred embodiment the flowmeter is symmetrical and has sections of oval cross-section that provide low bending resistance to the vibration at the points where the amplitude of vibration is the largest. The preferred embodiment uses electronic signal detection/processing means that generates two signals proportional to flow tube velocity in the direction of vibration of equal distance but on opposite sides of the plane of symmetry of the tube, generates a sum and a difference of the two signals, integrates the sum, demodulates the integrated signal and the difference of the two signals to produce peak amplitude signals, and divides the peak amplitude signals to produce an output that is proportional to mass flow rate. The preferred embodiment is further equipped with a novel acoustic wave suppressor, including a bypass conduit and a flexible diaphragm mounted within the flow tube, which suppresses acoustic waves by transmitting them across the diaphragm, thus isolating the flowmeter from the acoustic waves.

5 Claims, 8 Drawing Sheets

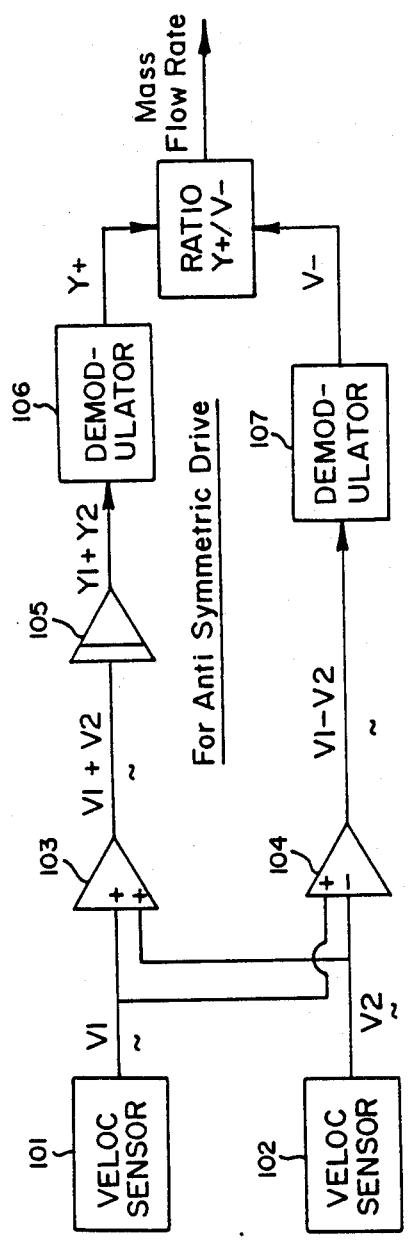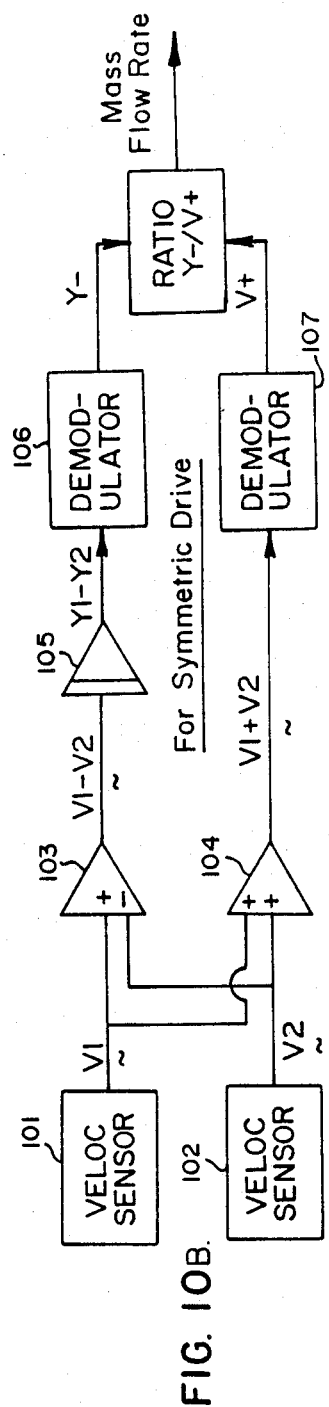
FIG. 10A.
FIG. 10B.

ACOUSTIC WAVE SUPRESSOR FOR CORIOLIS FLOW METER

CROSS-REFERENCE TO RELATED APPLICATION

This application is a division of application Ser. No. 06/873,201, filed June 11, 1986 which is a continuation-in-part of Ser. No. 856,939 filed Apr. 28, 1986, now abandoned, which application is a continuation-in-part of copending U.S. patent application Ser. No. 856,939, filed Apr. 28, 1986, now abandoned.

DESCRIPTION

Technical Field

This invention is in the field of direct mass flowmeters. More particularly, it concerns an acoustic wave suppressor for a Coriolis-type mass flowmeter.

Background

A. Mass Flowmeters

Mass flowmeters (or direct mass flowmeters) have sensing means which respond uniquely to mass flow rate. Other flowmeters employ, for example, sensing means which respond to differential pressure or fluid velocity. If one needs to measure mass flow rate with such devices one must perform separate measurement of density and infer some flow distribution pattern in the cross section of the meter and also infer fluid flow pattern, such as turbulence. They also require Newtonian fluid behavior, which is often not met.

Thus for reason of measurement simplicity alone, the direct mass flowmeters are very desirable. Additionally, other flowmeters generally lend themselves much better to volume flow rate measurement (gallons per minute or liter per second) than to mass flow measurement (tons/hour or kilograms/second). In practice the mass flow measurement is much more useful because chemical reactions require blending of proportional mass (not volume) of ingredients and product specifications mostly refer to mass percentage of ingredients not volume percentage. Thus this represents another major advantage of direct mass flow measurement over other techniques.

Coriolis flowmeters are direct mass flowmeters. They employ the principle of the Coriolis force and use the influence of a pattern of such forces upon a flow tube carrying the fluid within the meter. Devices disclosed to date employ one or two flow tubes which may split the fluid stream and carry a fraction each or may carry the fluid stream serially through both tubes. The flow tubes are typically vibrated by magnetic force coupling between a drive coil and permanent magnet, one or both of which are attached to a flow tube. To permit attachment to outside pipes the end of the flow tubes do not participate in the vibration.

For each part of a flow tube which is momentarily not parallel with the axis of rotation for the element, a Coriolis force is produced. The force acts through the body of the fluid, which will produce pressure on the flow tube wall. The magnitude of the Coriolis force is proportional to the mass flow rate, the angular velocity of rotation and the sine of the angle between flow direction within the element and the direction of the rotation vector.

Under the aggregate of Coriolis forces upon the different parts of the flow tube the flow tube will have motion in addition to the motion caused by the drive (vibrating) motion. "Motion" in this application is used to describe position, velocity, acceleration of a point or aggregate of points on the flow tube or any time-derivative or time-integral of these variables. Over the time of a single flow measurement the flow tube's motion is periodic and any one of these physical variables for almost any point on the flow tube together with known vibrating frequency and amplitude permits determination of the flow rate. The dependency of flow rate determination on drive frequency and amplitude has been of fundamental importance in the design of prior Coriolis mass flowmeters.

When mass flow rate changes the flow tube motion changes which is the principle of the flow measurement. However, if the drive amplitude changes, the Coriolis portion of the motion changes also. If one did not know the new amplitude (for example by absence or inaccuracy of amplitude measurement), the flowmeter may not distinguish a flow rate change from the amplitude change. Similarly, if the fluid temperature changes, the flow tube wall temperature would also change. The elasticity coefficient (Young's modulus) for the flow tube material changes with temperature impacting the Coriolis force induced motion. A change of 10° C. would potentially bring the flowmeter outside specified calibration accuracy (for example 0.2% of reading) if the flow tube was made of stainless steel.

Fluid pressure change modifies the cross section dimension of the flow tube and, thereby, its bending properties. Large pressure changes which may occur in practice can jeopardize calibration accuracy unless the flowmeter design eliminates this hazard.

Major considerations for Coriolis flowmeters are calibration sensitivity and immunity to density change. Process fluids seen by the flowmeter may undergo extensive density change. The reason may be change of fluid temperature and composition. The density change will modify the natural frequency of vibration for the flow tube. Since the flow tubes are usually driven in the immediate vicinity of a natural frequency, the drive frequency will change with density. The flowmeter design determines the extent or complete absence of calibration error due to density shift.

Another problem for Coriolis flowmeters (as well as other types) is entrainment of gases in the fluid. The gas may be in the form of visible or microscopic size bubbles. Gas entrainment causes both density change and change in the coupling between the fluid and the wall of the measurement tube essential for the Coriolis flowmeter. Generally Coriolis flowmeters today exhibit significant to intolerable errors in calibration when the gas entrainment reaches a magnitude of 1% to 3% by volume of gas to volume of fluid.

There is little distinction in principle between Coriolis flowmeters of one or two tube design especially when in the two tube design the tubes are symmetrical and the measurement reference for drive and motion sensing of one flow tube is the other tube. A single flow tube device must use a reference which is not a tube with process fluid. It can be a tube without process fluid, a blade spring or the reference can be the housing itself. A major consideration is mounting requirements to eliminate influence from floor vibrations or pressure pulsation in the process fluid. Another major consideration is that the calibration of the flowmeter does not degenerate excessively when the fluid density changes.

In the past all single flow tube Coriolis mass flowmeters which have had flow tubes with an inside diameter larger than ¼ inch and have employed a single flow tube design have required extremely complicated mounting. Even after being bolted to a ton of concrete such meters have been reported to be unduly influenced by floor vibration in an ordinary industrial plant. Double flow tube design of similar capacity functions properly in this environment. There is thus an advantage in double tube design.

However, the double tube design has significant drawbacks. It is more costly and may require a flow-splitting section and a flow-combining section made out of cast bodies and having the flow tubes attached by welding. This involves extra cost compared with single flow tube design. It also introduces a physical hazard due to welding attachments which are far more prone to stress corrosion than the flow tube material itself.

Pressure drop is a major factor in many Coriolis flowmeter applications. These meters have become widely used for highly viscous fluids and thick slurries, for example, asphalt, latex paint and peanut butter. In order to keep the pressure drop compatible with the pumping capacity in the line, it is necessary in such applications to work with low mass flow rates. It is also necessary that the flowmeter does not introduce a pressure drop in excess of available pump capacity. In other words, it is of interest to employ a flowmeter with a large diameter and short flow tube but still seeing a low mass flow rate. This may introduce a sensitivity requirement beyond the capacity of all current Coriolis flowmeter designs.

Acoustic waves generated by pumps and other process equipment can cause considerable deterioration of Coriolis flowmeter measurements especially if these waves are periodic and have frequencies in the domain of the drive frequency or the natural frequency of the mode shape closest to the bending caused by the Coriolis forces. Frequent transient random acoustic disturbances may cause similar problems. The flowmeter may lose the ability to dintinguish between motion caused by such disturbance from a flow rate change.

The many restrictions stated above are major factors in Coriolis flowmeter design. The present invention addresses all of these restrictions.

Descriptions of Coriolis flowmeters often state that the vibration maintained is at a "natural frequency" of a mode of free (unformed) vibration. In contrast, forced vibrations exhibit the phenomenon of resonance implying maximum response to the driving force. The resonance frequency for a structure of very low damping (typical for most Coriolis flowmeters) is almost the same but not exactly the same as its natural frequency at the proper mode. The magnitude of existing damping and the method of forcing determine the difference. Since all Coriolis flowmeters are exposed to some force to maintain the vibrations, there must necessarily be a difference between the exact natural frequency and the one which is actually achieved. In order to simplify the description this small distinction will be ignored and where disclosures have been made stating that the structures are vibrated at a "natural frequency" this will be considered equivalent with operation at resonance with some selected mode.

B. Prior Patents

The advantages of the Coriolis flowmeter, principle has stimulated the development of many patents. Among them are the following:

U.S. Pat. No. 3,329,019 (Sipin) discloses two straight single tube Coriolis mass flowmeter embodiments. The preferred embodiment (FIGS. 2, 3, 4 of the patent) employs a driving force in the center of a uniform flow tube using a fixed frequency, mechanical drive. The bending produced by the drive motion is of single polarity along the whole flow tube at every instant of operation (ignoring the effect of Coriolis force bending). The flow tube is semi-pinned at the ends with blade-springs. Strain gauges on these springs sense the tube motion and the difference between the strain gauge signals is computed by a bridge circuit. This difference represents flow and is displayed on a meter.

One major drawback of the Sipin meter is that the mechanical drive forcing vibration of a low-damped mechanical system will introduce complex signal waveforms with resulting poor measurement sensitivity. The sensitivity of measurement using a drive bending pattern is low due to relatively low angular velocities produced along the beam with small Coriolis force magnitudes. If sensitivity is enhanced by driving near the first mode natural frequency, the mechanical system would become excessively irregular causing huge disturbance levels on the signals. A further drawback is that the meter is highly sensitive to amplitude and frequency of the drive motion making overall performance prohibitively low. Another drawback is the seals which are employed for attaching the flow tubes to the meter body in order to give the springs freedom of action. Under process conditions such seals would be prone to leak.

The major differences between this Sipin device and the present invention are:

1. The present invention drives the beam in resonance with a higher anti-symmetric frequency mode. This requires much less driving force and power consumption and also furnishes smooth operation.

2. The present invention drives the beam with opposing polarity on each half of the beam at every instant in time. The preferred embodiment of the invention uses a nonuniform beam cross section profile and mass distribution. Combined with feature (1) this results in an order of magnitude higher sensitivity. This design is insensitive to drive amplitude and frequency changes.

The second embodiment in the Sipin patent (FIGS. 7, 8, 9 of the patent) employs a single, straight, uniform flow tube which is attached with bellows to inlet and outlet pipe sections. It is vibrated in the center with an electromagnetic drive at constant frequency. The drive motion represents a single polarity waveform along the tube at any instant in time. Two coil/magnet sensors mounted on the flow tube near the bellows produce velocity signals. These signals are fed to two amplifiers, one of which forms the sum, the other the difference between the velocity signals. The difference is employed as a measure of the mass flow rate. The sum is a measure of drive amplitude and is used in a feedback control for drive amplitude control.

The second Sipin embodiment has reduced calibration sensitivity to drive amplitude due to feedback control. However, the flowmeter calibration accuracy will depend on the stability of the control loop to hold the amplitude within the performance specifications typically required for Coriolis flowmeters. Furthermore, the meter is sensitive to the constancy of the drive frequency regulation and unavoidable inaccuracy will directly impact flowmeter calibration accuracy. The meter depends on a soft bellows for obtaining sensitivity. Bellows tend to introduce very large calibration sensitivity to fluid static pressure change and this would create a major practical problem. With harder bellows the sensitivity of this design pattern is much less than the present invention.

The differences between the second Sipin embodiment and the present invention are:

1. The present invention uses opposing polarity of drive position and velocity for each half of the beam. This invention measures the response in areas of the beam where the wave shape of the Coriolis force induced motion is similar to the bending mode for the lowest natural frequency giving far higher sensitivity. This invention is fundamentally independent of both drive amplitude and frequency regardless of the accuracy or absence of control of either variable. The preferred embodiment of this invention uses a nonuniform cross section profile and mass distribution. This invention does not employ a bellows.

U.S. Pat. Nos. 3,355,944 and 3,485,098 (Sipin) show single tube meters with some curvature as well as full shaped U-tubes in different embodiments. All employ a central drive, implying single polarity deviation of the flow tube from equilibrium at all times. Again this is exactly opposite to the philosophy of the present invention. An embodiment without bellows is shown. These embodiments depend on flow tube relaxed position curvature.

U.S. Pat. No. 4,109,524 (Smith) discloses a three section flow tube with a center section connected with bellows to the outer sections. Each section is straight and uniform and all three have coinciding central axes. A fixed frequency, mechanical drive in the center moves the sections so that at any instant of time the deflection from the center position is of the same polarity for all points on all three sections. This is opposite to the present invention. The Smith design employs force balance repositioning of the center beam. The torque is measured each time the central beam passes through its central position. The magnitude of that torque is employed as a measure of the mass flow rate. U.S. Pat. No. 4,109,524 has the same differences from the present invention as the meters of the Sipin patents. Additionally, the present invention does not employ torque measurement and it does not perform "snapshot observation" at a central position.

U.S. Pat. No. 127,028 (Cox & Gonzales) discloses a double flow tube meter design. The flow tubes are of identical shape and construction. Both are U-shaped but with the legs of the U drawn together. They are mounted in parallel, cantilevered fashion on a fixed mount. The fluid flows through in the same direction through both U tubes. The drive is electromagnetic with a drive coil on one U (at the bottom point of the bight end) and a magnet on the other U in the equiresonance frequency associated with the lowest frequency mode with vibration around the mounting point. The Coriolis forces twist the U tubes so that they are no longer plane. This motion element corresponds to another vibrating mode. The U tubes are shaped so that the natural frequency of the response mode is nearly the same as the drive resonance frequency. The objective is to enhance the response magnitude. A drawback not discussed by the patentees is that the response will become dependent on the natural damping which is introduced by fluid/flow tube interaction and internal crystal motion in the tube walls. Coil/magnet sensors measure the velocities of the sidelegs of the U tubes with respect to each other at chosen symmetrical locations on each leg.

The Cox & Gonzales meter is similar to the present invention in the use of forced vibration at a natural frequency and a structural design where the response deflection pattern is predominantly in a mode which does not have a widely different natural frequency. Major differences between the disclosure and a basic aspect of the present invention are that the invention uses substantially straight flow tubes rather than U tubes and that the invention forces vibration in the second (or higher) mode not the lowest mode with respect to rotation around the mounts. Finally the present invention is independent of changes in damping.

U.S. Pat. No. Re 31,450 (Smith) covers a commercial product, now withdrawn, produced by Micromotion Inc. The primary embodiment (FIGS. 1-8 of the patent) employs a single U-shaped flow tube with cantilever attachment to a fixed mount at the ends of the flow tube. An electromagnetic drive using peak detector feedback vibrates the flow tube with parallel drive motion of each leg of the U except for the influence of Coriolis forces. The drive coil is mounted on a blade spring and the drive magnet on the flow tube. The blade spring is manually adjusted to match the natural frequency of the flow tube in its first vibrating mode when the flow tube is filled with a fluid of a particular density. If the fluid had a different density, a different adjustment (by weight modification must be done. The flow tube is vibrated at the resonance frequency of its first natural mode of vibration. Optical sensors measure the twist of the U tubes at symmetrical points on the legs similar to Cox & Gonzales. The sensor signals are an on/off-type using the effect of a shadow of blades mounted on the legs. When the shadow of the first leg arrives at the relaxed position (midplane) it triggers a photodetector to start a counter. When the other leg triggers its photodetector, the count is taken. The time differential for the midplane arrival is used for proportional determination of the mass flow rate. The twisting motion of the U coincides with the motion occurring during free natural vibration in mode with higher frequency than the drive frequency.

The main drawback of the method described by U.S. Pat. No. Re 31,450 is that it depends on the housing as position reference. Any gradual warping of this housing due to stress release or other reason would bring in a sustained calibration shift. The instrument is extremely sensitive to floor and outside pipe vibrations and requires rigid attachment to huge weights such as concrete blocks. The assumption of linear relationship between flow rate and midplane time differential applies only for small time differentials which restricts the range of measurement. The design is also sensitive to fluid density change and natural frequency change due to changes in fluid temperature and pressure. Drift of the feedback-controlled drive amplitude will also cause calibration errors.

U.S. Pat. No. 4,422,338 (Smith) covers a meter sold by Micromotion Inc. under the name C-Model. This patent discloses a design which is, in principle, identical to the preferred embodiment of U.S. Pat. No. Re 31,450. The difference is that the optical sensors have been replaced by magnet/coil velocity sensors and that the blade spring for drive counterbalance has been replaced by an empty flow tube. The signals from the velocity sensors are integrated and amplified into square waveform. This provides waveform and phase identity with the signals produced by the optical "shadow sensors" employed in the U.S. Pat. No. Re 31,450 design. The signals are used in the same manner to determine the difference in arrival time at the midplane. The drive system in this disclosure is the same as disclosed in U.S. Pat. No. Re 31,450. In order to eliminate drift which could (and does) occur in the integrators, these circuits are limited to the frequency domain of the drive frequency and no integration is performed at a low or zero frequency. Except for the freedom from gradual shift in housing position this design has all the other drawbacks pointed out for the design of U.S. Pat. No. Re 31,450.

Major differences between the two Smith patents just described and the present invention are as follows: First, an aspect of this invention uses substantially straight flow tubes, not U tubes. This invention drives the flow tube at a resonance frequency corresponding to a high anti-symmetric mode not to its first mode. This invention does not employ any time measurement in its preferred embodiment. In an alternative embodiment, this invention uses time measurement for phase detection without reference to a midplane location. In this embodiment this invention does not assume linear relationships. This invention in its preferred embodiment does not use a blade spring or empty flow tube as counterbalance in the drive force application. This invention uses a detection method which eliminates all sensitivity to fluid density, inaccuracy in drive amplitude regulation, and drive frequency change.

U.S. Pat. No. 4,491,025 (Smith & Cage) describes meters that are sold by Micromotion Inc. under the designation "D-Model". The meters use two U tubes similar to Cox & Gonzales but the legs are straight in the vicinity of the mount and over most of the sides of the tubes. It uses an electromagnetic drive acting between the tubes creating relative motion. Magnet/coil velocity sensors determine the relative motion between the sensors as in the Cox & Gonzales design. Some elements of the meters of U.S. Pat. No. 4,422,038 are incorporated in the preferred embodiment of U.S. Pat. No. 4,491,025, namely the integrators and amplifiers which convert the resulting position signals to square waves. These square waves control a counter for measurement of time differential at arrival at "the respective midplanes" of the tubes. The devices sold by Micromotion which are stated to be covered by this patent do not have any feature for "midplane" or "relaxed position" determination but simply trigger the counter for timing when the integrated velocity signals pass at some preset and constant deviation from zero. The patent also discloses "plenums" or two small chambers which are provided at the inlet and outlet of the flow tubes. The fluid is split into two streams and recombined with a plenum handling each of those functions. No physical mechanism explaining how the plena improve the operation is furnished. They do not allow wave bypass or attenuation by a tuned hydraulic circuit as disclosed in the present application.

The meter of U.S. Pat. No. 4,491,025 has the same limitations as that of U.S. Pat. No. 4,422,338 except that the anchoring of the flowmeter to a huge mass of material is not necessary.

U.S. Pat. No. 4,559,833 (Sipin) describes a commercial Coriolis flowmeter sold by Smith Meter Company. It employs single or double, parallel flow tubes in different embodiments. The flow tubes are S-shaped. The drive force is applied at the center of the S. Sensing devices are mounted near the top and bottom of the S. In one embodiment the sensors are optical on/off switches and difference in arrival time at a fixed position is used as a measure of flow rate. Another embodiment employs analog deflection sensors and the difference of the two transducer signals is used to determine the flow rate. A counterbalancing spring for the drive is also presented as an additional embodiment of the drive system.

In contrast to U.S. Pat. No. 4,559,833, the present invention does not use an S-shaped conduit as a flow tube. In the preferred embodiment, this invention uses the difference in separately located motion sensor signals. However, the present invention creates a unique previously undetected advantage by a particular combination of such differential signals with other mathematical operation. This gives major advantages over the design disclosed in U.S. Pat. No. 4,559,833 in terms of independency to density, drive frequency and amplitude shifts.

U.S. patent application Ser. No. 775,739 filed 9-13-85 (in the name of the present applicant) describes commercial products sold by Exac Corporation. That application describes single and multi flow tube design where each flow tube has a helical design (cross-over loop). The drive vibration is at the lowest resonance frequency of the structure. The Coriolis forces twist the loop and produce a response predominantly in the third mode of natural vibration. In one embodiment sensors on each side of the loop are used for differential phase measurement using nonlinear relationship including tangent function. This embodiment requires determination of drive frequency to be used in the measurement algorithm. It employs a temperature sensor attached to the flow tube to furnish compensation for fluid temperature change. Another disclosed sensing embodiment uses a position or velocity measurement between two tube sections at the crossover point. Electromagnetic dampeners are presented for restricting loop vibrations. A disclosure is made of a velocity feedback control loop for continuous feedback regulation of loop velocity in the direction of the drive.

U.S. Pat. No. 4,660,421, issued to Dahlin et al., also describes commercial products sold by Exac Corporation. The application expands on a special version of the helical loop design described in Ser. No. 775,739. The latter discloses a general helical loop which might have a circle as projection on a certain plane or have a projection of any other shape. The former designates a projected shape with elongation in the direction of the opposed situated inlet and outlet flanges. It also shows the usage of a horseshoe magnet and coil as an embodiment of local velocity sensing.

The present invention is different from the meters described in the referenced U.S. patent applications due to the absence of crossover loops. The present invention operates with a drive frequency which is the resonance frequency for a higher mode than the mode in which the response to the Coriolis forces occurs, which is opposite to the teachings of Ser. Nos. 775,739 and 777,707 filed 9-13-85. The instant invention accomplishes in its preferred embodiment frequency independency without the complexity of explicit measurement of that frequency. This invention is also fundamentally independent of frequency instead of relying on a particular approximate formula for adjustment to frequency change. The present invention has an additional advantage over the devices of Ser. Nos. 775,739 and 777,707, namely that it has fundamental independency to drive amplitude shift in contrast to an independency which is valid only as long as constancy in pulse wave form is maintained.

C. Related Product Literature

The following commercial product literature discloses technology related to the present invention.

Hewlett-Packard Application Note No 200-3 (1974) entitled "Precisiontime Interval Measurement Using an Electronic Counter". This document describes a standard product for determining the phase angle between two periodic electronic signals having the same frequency. It uses the time difference between zero crossing of the two signals determined by a counter started and stopped by the leading and trailing signal, respectively. It also determines by separate counting the frequency itself and obtains the phase angle by division.

Danfoss Type Mass 1000/1100 Mass Flowmeter (brochure printed 1985). This document describes a Coriolis flowmeter using two slightly curved uniform flow tubes. The process flow stream is divided with each flow tube carrying a fraction. The flow tubes are rigidly attached at both ends adjacent to each other. An electromagnetic drive with a drive coil is mounted at the center of one flow tube and a magnet is mounted opposite to it and in the center of the other flow tube. The drive operates at the resonance frequency of the first mode of vibration. Magnet/coil type velocity sensors mounted at about ¼ and ¾ distance from the end determine the combined motion due to drive and Coriolis forces. The sense coils are mounted on one flow tube and the sense magnets on the other and thus the device detects relative motion similar to Cox & Gonzales. The time differential between arrival at zero velocity seen at the two sensor locations is employed as a measure of flow rate. The time differential is determined by an electronic counter. The deflection due to Coriolis forces is in a modeshape of higher frequency than the drive frequency.

The major differences between the Danfoss design and the instant invention are as follows: The present invention in one of its preferred embodiment uses one flow tube, not two. This invention drives the flow tube at the resonance frequency corresponding to a higher anti-symmetric mode rather than the first mode. The instant invention measures the response in a far more sensitive deflection pattern. Combined with this advantage the present invention applies a unique nonuniform flow tube cross section and mass distribution for further enhancement of sensitivity. The combined result is one to two orders of magnitude higher sensitivity with this invention than the Danfoss design deriving from flow tube design and operation only. Furthermore, this invention employs a unique signal handling method leading to immunity to fluid density, drive frequency and amplitude shift.

Solartron Transducers, Houston, Tex. Brochure: Liquid Density Transducers Type 7830 and 7840. This brochure describes densitometers which use one vibrating flow tube for its primary sensing function. The natural frequency of vibration or the associated nearby resonance frequency for forced vibration is a function of the fluid density. Larger mass within the fixed volume confinement of the flow tube makes the tube vibrate slower. This densitometer is stated to operate "at one of its natural frequencies" and is stated to "overcome the normal difficulties associated with vibrating a single straight tube". This must be interpreted to imply a drive frequency at a higher mode than the first mode since many other densitometer disclosures have operation in the first mode. The present invention also uses a drive in a higher frequency mode and uses a straight single tube. However, a totally different set of problems originates in the design of a Coriolis flowmeter than in a vibrating densitometer. The reasons and some of the major motivation in the flowmeter design for using the higher mode drive frequency is the need for sensitivity in detecting influence of Coriolis forces, which are not essential and probably a nuisance for densitometer design. In order to make a higher mode Coriolis flowmeter successful, different understanding and design considerations come into the forefront which have no relevance for the densitometer design. The enhancement of flowmeter response by nonuniform cross section profile and mass distribution presented in this invention would not be meaningful for the densitometer design.

OBJECTS OF THE INVENTION

One major overall purpose of this invention is to provide a commercial product usable in process industries and commercial businesses permitting accurate and economical mass flow measurement. Such measurement has great economic impact on production economy and product quality in industries and a large number of businesses.

Due to enormous safety hazards which exist in many process operations another major purpose is to provide a device which can be economically produced without jeopardy of the most stringent safety requirements.

A third major objective is to provide a device which can be operated economically, specifically meaning operation with a minimum of power consumption. This power consumption refers to pumping power to overcome the pressure drop caused by the flowmeter insertion in a process line.

A fourth major objective is to provide a device which has so high a measurement sensitivity that it can be used for important applications where it has not previously been possible to perform a flow measurement at all. A frequent reason for this may be extremely high viscosity.

Translating these overall objectives into more detailed design objectives the following are key aspects of the invention.

The invention provides a flowmeter which can be used in average size pipes using only a single, straight flow tube. Average size implies pipes of inside diameter of ¼ to ¾ inch. Today no such Coriolis flowmeter exists. There are many advantages of single flow tube devices namely: higher safety due to absence of welding connections in the flow tube; lower manufacturing cost; lower pressure drop in reducing pumping cost and permitting usage with more viscous fluids; and lower weight which simplifies installation in free-hanging piping systems.

The invention furnishes a direct mass flowmeter which fundamentally has its calibration immune to fluid density change and control accuracy of drive frequency and amplitude without auxiliary compensatory measurement. No such device exists in the prior art.

Another objective is to furnish a flowmeter that has less calibration errors to gas entrainment than other Coriolis flowmeters by elimination of sensitivity to extra phase shift between sensor signals introduced by such entrainment.

The invention furnishes a flowmeter which has its calibration less sensitive to fluid temperature and pressure change without introduction of auxiliary measurement. It can also accomplish such compensation for elimination of remaining sensitivity by introduction of auxiliary transducers and computing means.

The invention furnishes a Coriolis flowmeter having higher accuracy than straight tube Coriolis flowmeters have achieved in prior art.

The invention furnishes far higher sensitivity than prior art straight tube Coriolis flowmeters have achieved and thereby permits a wider measurement range.

The invention furnishes higher immunity to floor and lateral pipe vibrations than achievable with prior art.

The invention furnishes an attachable device which permits flowmeter operation in the presence of periodic or random acoustical waves in the connecting pipes.

BRIEF DESCRIPTION OF THE DRAWINGS

The drawings are not to scale and some dimensions are distorted for the purpose of illustration. Like elements are referred to by like numerals in the drawings.

FIG. 10 is a diagram of the preferred circuit for processing the signals generated by the sensors of the meter of FIG. 1. Part A of the Figure shows the circuit used to process signals for meters using an anti-symmetric drive and Part B of the Figure shows the circuit used to process signal for meters using a symmetric drive.

MODES FOR CARRYING OUT THE INVENTION

A. Flow Tube and Housing

Figure 1:
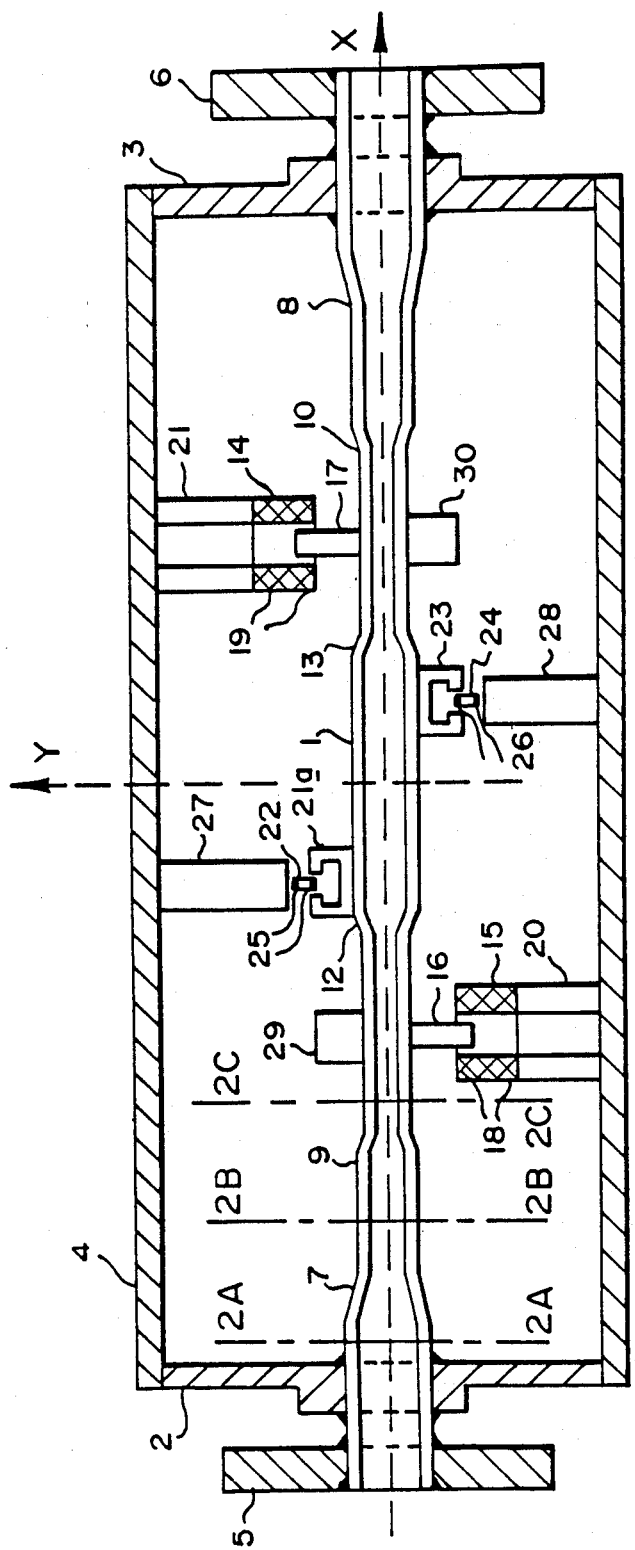
FIG. 1 is an elevational, sectional view of a first preferred embodiment of the Coriolis flowmeter of the invention.

A first preferred embodiment of the invention for flowmeters having a flow tube diameter of ¾ inch or less is shown in FIG. 1. A flow tube 1 is rigidly attached to the sidewalls 2 and 3 of a housing 4. The flow tube penetrates the sidewalls and has flanges 5 and 6 mounted on it. These flanges are used to attach the flowmeter to the pipes carrying the process fluid.

Figure 2A:
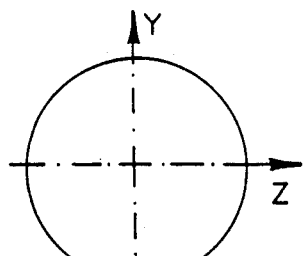
FIGS. 2A, 2B, and 2C are enlarged views taken at lines 2A—2A, 2B—2B, and 2C—2C of FIG. 1 showing the cross-sectional shapes of segments of the flow tube of the meter of FIG. 1.
Figure 2B:
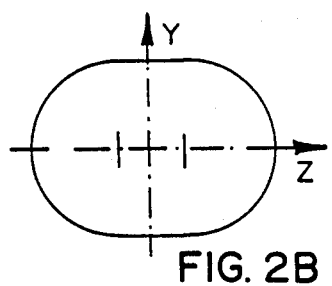
Figure 2C:
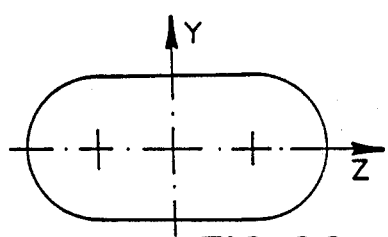

The flow tube has non-uniform cross section dimensions along its length as illustrated in FIGS. 2A, B, and C. The non-uniformity has been caused by using an original tube with circular cross section and forming sections of oval cross section in the tube. Specifically the tube has a circular cross section at the flanges and through the sidewalls. A very short distance from the sidwalls and from points 7 to 9 and 8 to 10 the tube has the oval cross section shown in FIG. 2B. The Z-axis in that figure is perpendicular to the paper in FIG. 1. Over the sections from 9 to 12 and 10 to 13 the tube has the cross section shown in FIG. 2C.

Figure 2D:
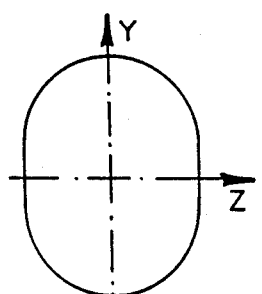
FIG. 2D is an enlarged sectional view showing an alternative geometry in which the tube is flattened along the Z axis rather than the Y axis. Such geometry might be used to stiffen the tube against bending. Such geometry might be used at the center of the tube. Alternatively, stiffening means such as additional cladding or increased tube thickness could be used instead of altering the tube geometry.

The central tube section between 12 and 13 has a cross section with the same dimensions as the sections 7 to 9 and 8 to 10. A stiffening of the central section will increase the resonance frequency of the first mode proportionally more than the second mode, which is advantageous from a sensitivity standpoint. A circular central section or a section elongated in the drive direction (such as in FIG. 2D) has an advantage from a measurement standpoint but may create some increase of fabrication costs.

The flow tube is symmetrical with respect to the Y-axis as well as the X-axis shown in FIG. 1. Both axes are in the plane of the paper. The X-axis coincides with the central, common axis for all the flow tube sections. The Y-axis is perpendicular to the X-axis with an origin in the middle of the flow tube. Thus all tube sections left of the Y-axis are of equal length to those with the same cross section right of the Y-axis.

The flow tube is vibrated by two magnet/coil assemblies shown as the coils 14 and 15 and the permanent magnets 16 and 17. The magnets are rigidly attached to the flow tube. The coils are rigidly attached to the housing by the stand-offs 20 and 21. The coils are driven synchronously by electrical currents fed through the windings 18 and 19, respectively. These currents produce magnetic fields which exert force on the permanent magnets 16 and 17. The direction of the forces are opposing so that when the coil 15 pulls the magnet 16 in the negative Y-direction the coil 14 pulls the magnet 17 in the positive Y-direction. By careful design of drive coils and magnets so that they exert the same force they can be driven in series from a single current source. Once the vibration has been activated and a desired frequency and amplitude domain has been reached, one drive coil may be disconnected, leaving the other to maintain the vibration alone. In that case the purpose of the second drive coil/magnet is start-up assistance to assure vibration in the wanted (second or higher natural mode). For start-up support, no careful matching of the two drive coil/magnet configurations is necessary.

The preferred embodiment uses two magnet/coil devices for motion detection. The term "motion" as used herein means the position, velocity, acceleration, or any time derivatives or time integrals of them. These sensors have permanent magnets 21a and 23 attached to the flow tube. The coils 22 and 24 are attached rigidly to the housing using stand-offs 27 and 28. The sensors are located near the center of the flow tube where the sensitivity is the largest but not so close that they interact with each other for example by coupling of magnetic fields.

When the flow tube vibrates in the XY-plane the changing flux from the magnets 21a and 23 induces an electromotive force in the sense coils 22 and 24 respectively. The windings 25 and 26 for the sense coils will have a voltage and deliver a signal to a suitable electronic device. The signal is proportional to the velocity of the flow tube at the sensor location. A small horseshoe magnet (e.g., 21a and 23) surrounding a short coil (e.g., 22 and 24) as shown in FIG. 1 is a suitable design for the velocity sensor. The horseshoe or C-shaped magnet is shown in a position where the "C" is in the XY-plane for ease of recognition of the function. In practice it is better to turn both the sense magnet and coil 90° to make the "C" be parallel to the YZ-plane.

The preferred embodiment in FIG. 1 has two masses, 29 and 30, attached to the flow tube in the vicinity of the drive magnets 16 and 17 respectively. These masses are used for adjustment of the ratio of two natural frequencies as discussed infra.

Figure 3A:
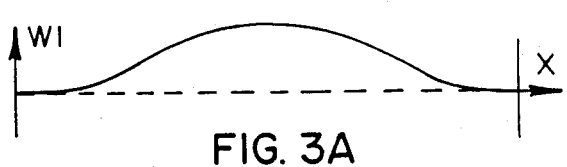
FIGS. 3A through 3E show deflection patterns for a straight beam (flow tube) fixedly mounted at both ends vibrated in the first through fifth modes of natural vibration, respectively.

The specific locations of drive devices, sensors and masses along the X-axis are as follows. A straight beam with fixed (cantilever) mount at both ends has a deflection pattern for natural or vibration in different modes as shown in FIGS. 3A–3E. FIG. 3A shows the lowest frequency for free (non-forced) vibration of the beam. (The resonance frequency (frequency of maximum response) for forced vibrations is only slightly different from the natural vibration frequency due to the very low damping of these vibrating structures and a flow tube properly driven at resonance with a mode will have essentially a pattern (relative amplitude along the tube) as occurs during natural (free) vibration. Note that the modes discussed here and in the following refer to modes with deflection in the drive direction. Other modes exist with deflection in other directions. Thus, the second mode in the drive direction may be the third lowest mode for the structure as a whole. For simplicity of description this mode is thus called the "second mode".

Figure 3B:
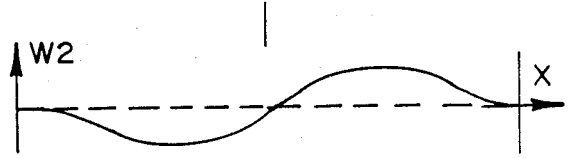
Figure 3C:
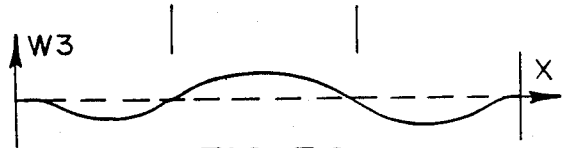
Figure 3D:
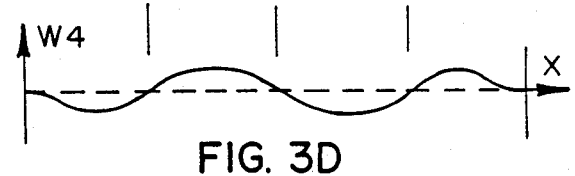
Figure 3E:
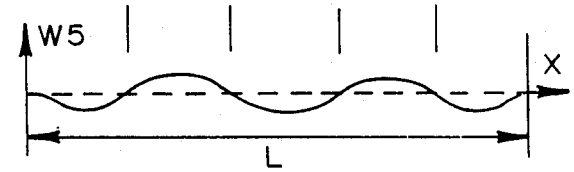

FIG. 3B shows the relative position (or velocity or acceleration) amplitude of the second natural mode of vibration. FIGS. 3C, 3D, and 3E show the relative amplitudes for the 3rd, 4th, and 5th mode of natural vibration, along the length of the beam. The mode curves in FIGS. 3A–3E are designated W1-W5. The shape of these curves depend on beam geometry and mass distribution. However, all uniform straight beams with cross section symmetry and the same mounting at the ends have the same mode shape. Each mode has its own natural frequency of (free) vibration or resonance frequency under forced vibration. This frequency is uniformly higher from the first mode to higher mode. The resonance frequency depends on geometry, mass distribution and elasticity of the beam and density of the fluid inside the beam (flow tube).

In this invention the tube is vibrated at the resonance frequency associated with and approximately equal to the frequency for natural vibration in a higher anti-symmetric mode, such as the second mode. This is one of the major features leading to much improved performance by this invention over prior art.

The location of the magnet/coil drive unit represented by 15 and 16 in FIG. 1 is approximately at the maximum of the amplitude envelope for Mode 2 (W2) of the flow tube. The flattened flow tube section 9 to 12 has a length which is about 12% of the full tube length. Its center is also at the maximum for the Mode 2 amplitude envelope. The velocity sensor is much closer to the center of the flow tube. The mass 29 is located opposite the drive points. All placement of the devices, tube section length and position as well as their cross section are symmetrical with respect to the tube midpoint. It is not essential that the drive elements are placed exactly at the extreme points of Mode 2 but it is essential that good symmetry is preserved between the left and right halves of the flow tube.

The location of the extreme point of the Mode 2 amplitude curve can be found accurately enough by trial and error, a computer model, or experimental flow tubes. Since the exact location is not crucial, few trials are needed. As a first approximation, one can use the well-known shape of a uniform beam presented in FIG. 3B which has the extreme points 29% and 71% of the beam length from the sidewall of the housing.

Figure 4:
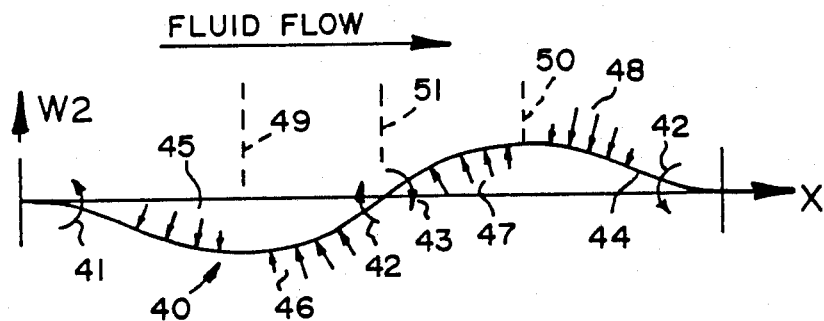
FIG. 4 is a second mode deflection pattern similar to FIG. 3B that shows the pattern of Coriolis factors acting on the beam.

The size of the masses 29 and 30 in FIG. 1 can be chosen, for instance, as shown in the following example. The purpose of the masses and flattening of the flow tube at 9 to 12 and 13 to 10 in FIG. 1 is to reduce the natural frequency of the second (drive) mode without impacting the natural frequency of the first mode as much. In other words the ratio of Mode 2 and Mode 1 natural frequency is reduced with a primary reduction of Mode 2 frequency. Another embodiment with a central spring is described hereinafter where the same ratio is reduced by increasing Mode 1 natural frequency but leaving Mode 2 unchanged. FIG. 4 shows the mode shape, W2, for a typical straight beam (flow tube) with both ends fixed. The W2 curve is marked 40. Driven by a sinusoidal driving force or vibrating under free vibration, the amplitude of W2 will vary sinusoidally with time at each point along the beam (X-axis). Ignoring lateral vibrations, the sinusoidal movement in the plane of oscillation has exactly the same phase and frequency at each point along the beam. In other words, the beam shape, W2, (relative amplitude along the beam) is invariant in time under influence of periodic (stationary) drive motion alone.

With fluid flowing through the tube, Coriolis forces act upon each element with different magnitude at each X-point. The magnitude at each point depends on the angular velocity the fluid experiences at that point. The Coriolis forces vary in time in the same manner (exactly in phase) as the Y-direction velocity. At an instant time when the drive motion is in the direction of reduced amplitude, W2 in FIG. 4, symbolized by curved arrows 41 and 44, a pattern of Coriolis forces will push the flow tube locally in the direction shown by the group of arrows 45–48. Note that the Y-projection of the Coriolis forces change polarity at maximum 50 and minimum 49 of the W2 curve as well as the central node 51 (W2 zero point).

Figure 5:
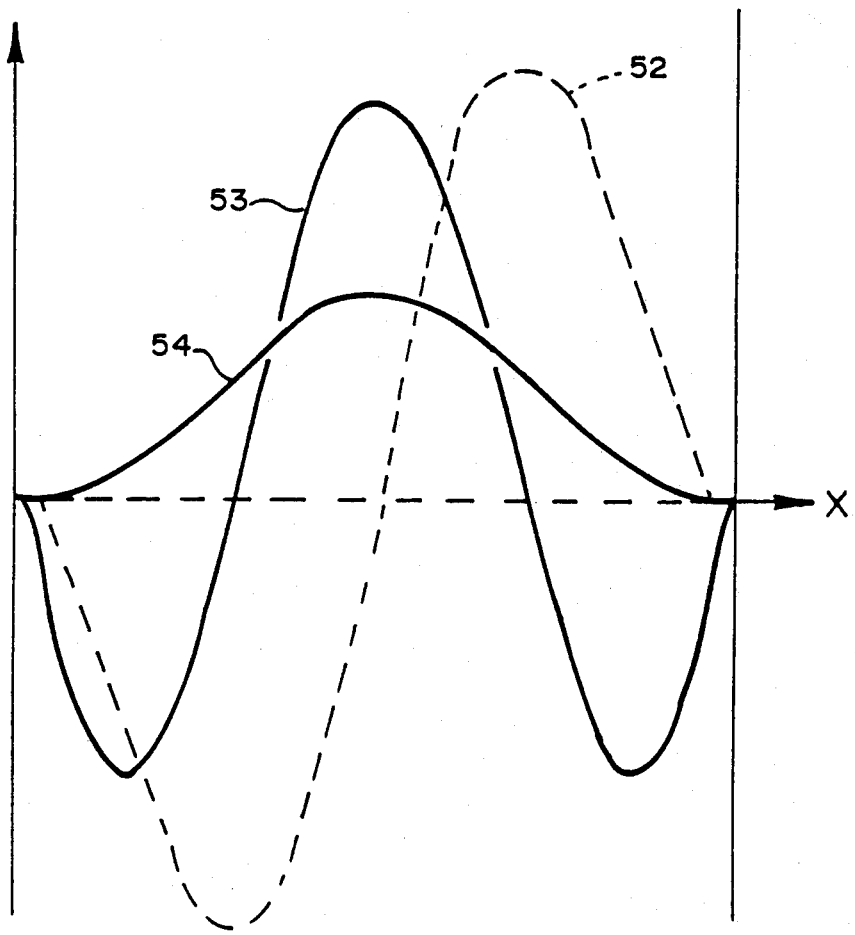
FIG. 5 is a graphical representation obtained by computer modeling of the second mode deflection pattern, Coriolis force amplitude distribution, and bending for a beam suspended as in FIGS. 3A–3E and vibrated in the second mode.

FIG. 5 shows a typical W2 curve (shaded black), marked 52, the Coriolis force amplitude (peak values) distribution, 53, and the bending, 54, resulting from Coriolis forces. The latter is bending caused by Coriolis forces alone and does not include the bending amplitude caused by the drive motion. The actual position of the beam at any position and at any instant in time is equal to the sum of the Coriolis force-induced bending position and the drive-induced position. However, the curve for actual flow tube position is not the sum (with inclusion of scale factors) of 52 and 54 since the Coriolis-induced response is not in phase with the drive motion. All curves were calculated by digital computer modeling. Note that the relative amplitude distribution for velocity and acceleration are the same as for position although the physical amplitudes are proportioned by the drive frequency. Thus the shapes of 52 and 54 apply also to velocity and acceleration.

The shape of the curve 54 in FIG. 5 is extremely important. The Coriolis forces are shown in FIG. 4 to be distributed in a manner which one would suspect would produce a bending pattern similar to the third mode shape (W3, FIG. 3C). On the contrary, the Coriolis forces induce a bending pattern which has an appearance of Mode 1. Computer analysis of this example shows 99.5% correlation between the Coriolis force-induced bending pattern and Mode 1 and that only 19.5% of the kinetic energy induced by the Coriolis forces falls in the third and higher modes.

The flow tube is far more flexible in Mode 1 than any in other mode. Therefore, the use of Mode 2 vibration leads to a Coriolis force distribution which acts upon the beam for its most sensitive deflection pattern. A computer simulation of drive in Mode 1 of the same beam has a domineering Coriolis force response pattern with the shape of Mode 2 (99.97% correlation). However, since Mode 2 represents a "stiffer envelope", the largest Coriolis force-induced deflection is only 4.5% of the largest deflection that can be caused by drive in Mode 2 in accordance with this invention.

The general philosophy here is exactly opposite to all prior art Coriolis flow meter designs. All prior art designs vibrate the flow tube or flow tubes with a drive-bending pattern for which the structure is the softest (namely Mode) and measures the Coriolis force-induced response by a deflection predominantly in higher mode, which is "stiffer" and furnishes low flow sensitivity. This invention drives with a bending pattern which represents a "stiffer shape" (Mode 2) and has a response in bending pattern where the structure is softer. It is intuitively obvious that this increases sensitivity. The design approach invented here is applicable to U tubes and crossover loops, as well.

The drive power is a function of frequency but otherwise approximately independent of the drive mode.

B. Example of Flow Tube Design

In order to illustrate the invention further, a specific example of the flow tube design is presented hereinafter. It is not claimed that the parameter values presented are optimal for any particular application. A second example illustrates comparative performance between a design by the teachings of this invention and a flowmeter with a straight uniform flow tube driven in Mode 1.

The following parameters have been chosen:
Flow tube length: 40 centimeters
Inside diameter: 10 millimeters (before flattening)
Outside diameter: 12 millimeters (before flattening)
Wall thickness: 1 millimeter
Material: Stainless steel (316L)

CROSS-SECTION DIMENSIONS (FIG. 1)

Location of Points 7 and 8: Zero distance from respective sidewall
Length 7 to 9 and 10 to 8: 9 centimeters
Y-direction outside measure of above sections: 11 millimeters
Length of 9 to 12 and 13 to 10: 5 centimeters
Y-direction outside dimension of above sections: 5.5 millimeters
Length of central section, 12 to 13: 12 centimeters
Y-direction outside dimension: 11 millimeters (same as end sections)
Mass attached at the center of each of sections 9 to 12 and 13 to 10 (includes the weight of drive and sense magnets): 70 grams
Fluid material: Water
Housing
  Outside diameter: 83 millimeters
  Wall thickness: 3 millimeters
  Material: Stainless Steel (304)
Total flowmeter weight with housing and fluid: 4.5 kilograms.

By computer modeling the following behavior was established:
Nominal fluid flow rate: 1 kilogram/second
Drive amplitude: 1 millimeter
Drive frequency (Mode 2): 2062 rad/second
Drive and sensor location (distance from sides): 11.5 centimeter
Coriolis effect response natural frequency (Mode 1): 1505 rad/second
Dynamic amplification factor: 1.140 (amplitude gain due to proximity of drive frequency to the natural frequency of the response mode)
Maximum Coriolis force amplitude: 0.78 Newton/cm
Maximum deflection due to Coriolis forces: 0.021 millimeter
Maximum Coriolis induced velocity: 48.5 millimeters/sec
Maximum drive velocity: 2.06 meters/sec
Maximum stress at mounts: 34.5 nm/m$^2$
Maximum % of fatigue limit: 16.7%
Drive momentum: 0
Drive angular momentum: 0.0014 nm
Vibration amplitude induced by flowmeter vibration: 0.015 millimeter (at flanges)
Flow tube natural frequency for vibration in the XZ-plane.
  Mode 1: Approximately 1800 rad/sec
  Mode 2: Approximately 4000 rad/sec
Housing natural frequency: Mode 1: 6549 rad/sec It can be seen that this flowmeter introduces negligible vibrations on the surrounding pipe and the single tube design shows no detriment. The flowmeter has very small size.

The behavior described above illustrates the purpose of flattening the flowmeter at the sections closest to the housing sidewalls. It makes the natural frequencies for the flow tube different for vibrations in the drive (XY) plane from the XZ-plane. This prevents outside disturbances which might start vibrations in the XZ-plane from influencing the vibrations in the drive-plane. The housing in this example is very stiff in order to furnish stability as reference for drive and velocity measurement.

The sensitivity of this flowmeter is very high. In order to create a simple perspective of this, a comparison was made by computer modeling of a design with a uniform flow tube with the same dimensions as the tube used in this example but before flattening. (Thus an inside diameter of 10 millimeters.) The commercial units available with a flow rate of 0.6 kilograms/second have a length of 74 centimeters and the unit presented above for 1 kg/second is only slightly over half of that length, which is a considerable practical advantage.

In order to approximately match such commercial units a length of 80 centimeters was chosen and a flow rate of 1 kilogram/second was used as nominal (designated "80 cm Mode 1"). To show the advantage of drive in a second mode modeling was made of a uniform flow tube of exactly the same dimension (80 centimeters long) and without any flattening from the circular shape and also without any weight or spring addition (designated "80 cm Mode 2"). "40 cm Mode 2" below is the same design as presented above.

The following results of special interest were obtained:

|  | 80 cm Mode 1 | 80 cm Mode 2 | 40 cm Mode 2 |
| --- | --- | --- | --- |
| Drive frequency r/s | 539 | 1486 | 2062 |
| Drive amplitude mm | 1 | 1 | 1 |
| Max Coriol Forc N/cm | 0.042 | 0.26 | 0.78 |
| Max Coriol Forc induced bending mm | 0.0067 | 0.022 | 0.024 |
| Max Coriol force induced veloc mm/s | 3.6 | 32.7 | 48.5 |
| Max Stress % of fatigue limit | 0.47% | 1.96% | 16.7% |

As shown, if velocity sensing is used, Mode 2 drive increases the sensitivity 9.1 times. The much more compact design with 40 cm length and the improved beam shapes is 13.5 times more sensitive than the design using drive in Mode 1. Using phase angle or time differential sensing methods still shows major advancement by the Mode 2 drive principle as embodied in this invention.

Other suitable embodiments of the invention follow from the flow tube design criteria taught above. The invention is superior to prior art design even without flattening of the flow tube and adding weight as shown in the above comparison. Therefore, feasible alternative embodiments are flow tubes operated as taught but using uniform shape either with circular or oval cross section.

Another feasible embodiment is to use a flow tube flattened at the locations taught but add no weights. Yet another feasible embodiment is to use uniform flow tube cross section geometry (symmetrical with respect to the plane of the drive) and add concentrated masses at the extreme points of the deflection curve for Mode 2 natural vibrations.

Figure 6:
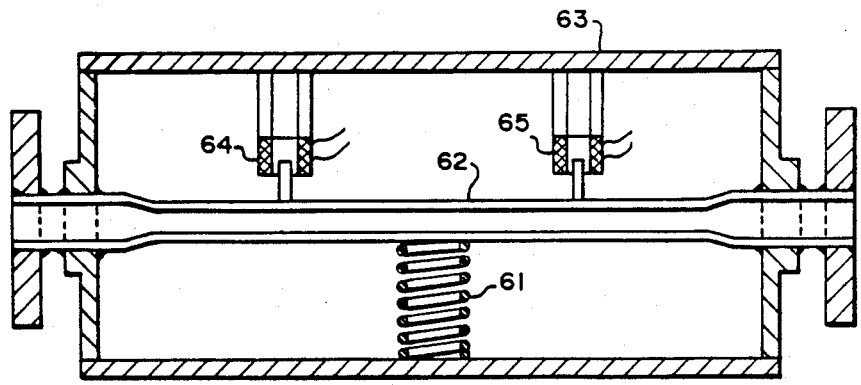
FIG. 6 is an elevational, sectional view of another embodiment of the Coriolis flowmeter of the invention.

The embodiments with the mass addition and flattening serve to reduce Mode 2 natural frequency with proportionally less influence on Mode 1 frequency. An additional alternative embodiment instead raises the Mode 1 natural frequency without change of the natural frequency in Mode 2. This embodiment is shown in FIG. 6 in which a flow tube 62 is depicted. Although FIG. 6 shows a tube of uniform cross-sectional shape, the flow tube can be of any shape and may also have concentrated masses added as taught previously. Electromagnetic drive assemblies 64 and 65 are used to vibrate the tube. A spring 61 has been added attached on one end to the center of the flow tube. The other end is attached to the housing 63. Although shown as a coil spring, blade springs or other suitable devices which perform the same function may be used. Since the spring is at the center of the beam where Mode 2 has a node (zero amplitude point) during the drive motion (ignoring bending from Coriolis forces which is of small magnitude) it will not have significant impact on Mode 2 natural frequency. However, the center has maximum amplitude for Mode 1 vibration. Therefore, the spring will influence Mode 1 natural frequency and the amplitude distribution of this mode.

The spring has to have a spring constant comparable to the spring constant characteristic for the beam bending with a concentrated force in the middle. If the two are equal the natural frequency for Mode 1 will increase by a factor of approximately 1.4.

Compared with the preferred embodiment using tube flattening and mass addition, the spring approach has the drawback of reducing the Coriolis force impact upon the structure and thereby signal level. The reason is that the Coriolis force response is predominantly in the amplitude distribution pattern of Mode 1. (The computer model showed that the Mode 2 drive placed 80% of the Coriolis force induced energy in Mode 1 and the balance distributed over Mode 3 and higher.)

Figure 7A:
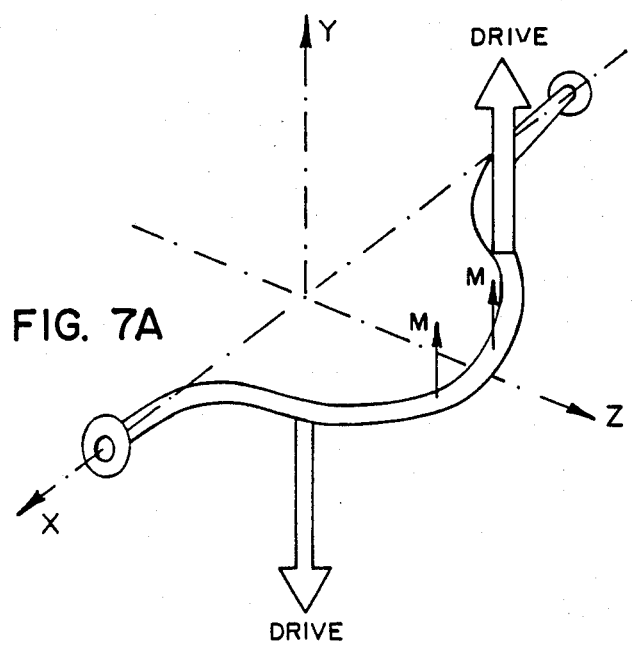
FIG. 7A is an elevational partly schematic view of another embodiment of a single tube Coriolis flowmeter of the invention.

The flow tubes of this invention do not have to be straight. For instance, one or two parallel flow tubes with curvature such as shown in FIG. 7A are feasible. As indicated by the large, open arrows, the drive motion is parallel with the Y-axis but in opposite direction on the opposite side of the Z-axis (line of symmetry). The measurement is performed by two sensors (not shown) at the locations "M" or by a single sensor at the symmetry point (Z-axis intersection with the flow tube) in accordance with the teachings of this invention. Other curved tube configurations such as S shapes, U shapes, or cross-over loops may also be used.

Further feasible embodiments involve multiple tube design (i.e., two or more flow tubes can be used), typically double tube design. Both tubes can carry the process fluid using serial or parallel connection along the lines disclosed in the prior art. If serial connection is used, for should be in the same direction. Alternatively, only one tube would carry the fluid and the other tube would be empty but having weight added for maintenance of resonance balance.

In these double tube designs drive coils and drive magnets are located exactly as described for the single tube embodiment except that the drive coils are mounted on the counterbalancing second tube instead of the housing. The velocity sensors may be mounted exactly the same way as described for the single tube design with the coils mounted on the housing. Only one tube would need the sensors or both could have sensors for the purpose of averaging the signals. Alternatively, the magnets could be mounted on one flow tube and the sense coils on the other tube. Flattening and concentrated mass addition is made the same way on both tubes for maintenance of the same motion dynamics for tubes at corresponding X-positions. Springs can be added either as described for the single tube between each flow tube and the housing or between the center points of the tubes.

The double tube design has the advantage of reducing the power requirement of the forced vibrating driving source. At a specified maximum power level the flow tube can be designed shorter with a double tube design than a single tube. In order to keep dimensions small at modest drive power, it is, therefore, advantageous to use double tube design for larger flow tubes such as one inch in diameter and greater. The drive power in the previous example (40 cm tube length) has by model analysis been determined to be 11 watts at one mm maximum drive deflection. It is quite feasible to use a smaller amplitude and 0.3 mm deflection requires a drive power of approximately one watt. For double tube design, a drive power of one watt is estimated to provide sufficient amplitude for flow tubes at least as large as 2 inches diameter.

Figure 7B:
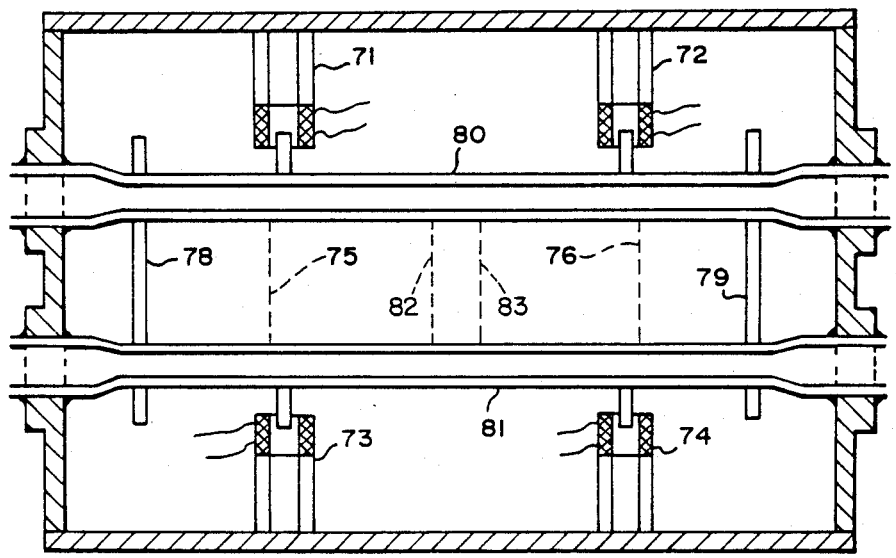
FIG. 7B is an elevational, sectional view of a double tube embodiment of the Coriolis flowmeter of the invention.

An example of one of these double tube embodiments is shown in FIG. 7B. Four electromagnetic drives 71, 72, 73, and 74 introduce and maintain vibrations in Mode 2 as taught previously. Alternatively, two forcing units could be used operating between the tubes 80 and 81 in the positions 75 and 76. The sensors are preferably mounted between the tubes at 82 and 83, similar to the sensors shown in FIG. 1. In FIG. 7 the tubes have been tied together with two plates 78 and 79. These plates are firmly attached to the flow tubes for example by brazing or welding. The effective length of the flow tubes defining the natural frequencies of vibration is the distance between the plates 78 and 79. The purpose of these plates is to provide a sharp definition of beam length for easier matching of the dynamics of the two tubes. Additionally the plates will prevent the natural vibration modes occurring when the two tubes move in parallel from coinciding in frequency for modes activated by the differential driving motion and differential response to Coriolis forces. In FIG. 7B the tubes are driven in the opposite direction so that when drive 71 pulls the tube 80 toward the housing, drive 73 pulls tube 81 toward the housing (in the opposite direction). However, at that instant, drives 72 and 74 push their respective ends of the flow tubes towards the center.

Figure 8:
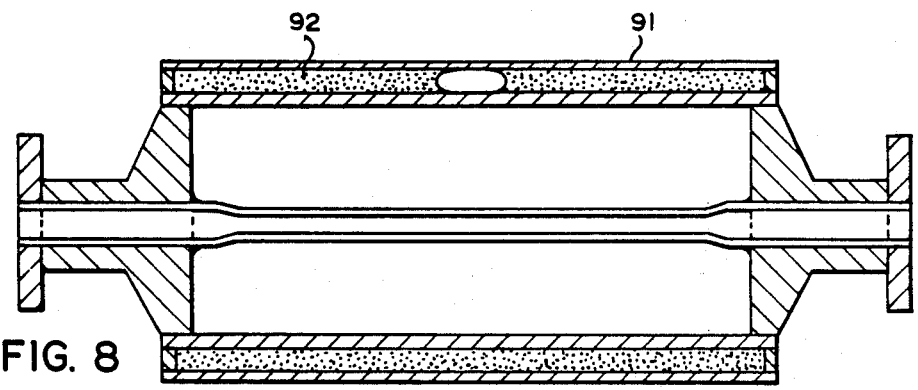
FIG. 8 is an elevational, sectional view of a Coriolis flowmeter showing an alternative housing structure that includes an acoustical insulating layer.

An alternative embodiment of the housing design illustrated in FIG. 1 is the design shown in FIG. 8. Especially when drive and measurements are referenced to the housing, it is desirable to dampen acoustic disturbances caused for example by tapping on the housing. The double wall housing in FIG. 8 has a relatively soft outer wall 91. An acoustical insulating material fills the space 92 between this outer wall and the inner wall which may form a cylinder as illustrated in the previous examples.

D. Signal Detection and Electronics

The preferred embodiment described previously uses velocity sensors located near the center of the flow tube. It was taught that the drive is in second (or higher anti-symmetric) mode of resonance or natural frequency and that the drive force should be applied in opposing directions on both sides of an symmetrically with respect to the center of the flow tube.

Other sensors beside velocity sensors are feasible including on/off devices combined with phase angle methods such as the one disclosed in the cited U.S. patent applications. The phase angle methods and time differential methods utilize electronic counters. Feasible counting rates are of the magnitude 5 megahertz giving 0.2 microsecond resolution of a time measurement. If 0.2 microsecond represents 0.1% of maximum flow reading, the Coriolis forces must roughly introduce a time delay between detection points of 200 microseconds. However, if one wants to maintain 0.1% of reading counting resolution at 10% of maximum flow, the time delay at maximum flow must be 2000 microseconds. Clearly, if only one percent resolution were required, 200 microseconds would still be sufficient for maximum flow time delay.

There are many advantages to operating at higher drive frequencies because this provides larger Coriolis forces and smaller physical dimensions. However, time resolution errors increase and counteract the benefit. The computer modeling for the 40 cm flow tube previously described has a time separation between the measurement points of only 238 microseconds. The 80 cm Mode 2 model has much longer time delay giving good latitude for counting methods with current electronics. Applying these well known techniques the best location for the sensors is at equal distance from the center and near the center.

The results indicate that the full benefit of the disclosed flow tube design and operation would be obtained readily with higher speed electronics, in which case the phase angle and time differential methods disclosed in the prior art can readily be implemented by anybody skilled in the electronics art. However, another method which is part of this invention and permits usage of compact flowmeter design will now be disclosed.

Figure 9:
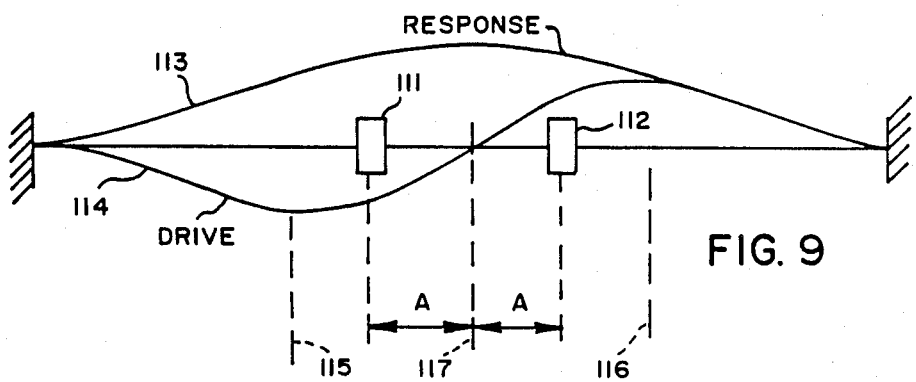
FIG. 9 is a schematic representation of a Coriolis flowmeter operated in accordance with the invention that depicts the drive motion and response motion curves and the position of sensors on the tube.

Consider the signals at the two sensors 111 and 112 in FIG. 9. The sensors are located symmetrically with respect to the midpoint. Assume that these sensors measre the flow tube position. The position at any instant in time has two components, one introduced by drive motion alone (equivalent to zero flow rate) and the other by the Coriolis forces. These components are not in phase and the total position is described by the following vector relationships.

$$Y1 = Yd1 + Yc1 \tag{1}$$

$$Y2 = Yd2 + Yc2 \tag{2}$$

where
Y1 = position at sensor 1
Y2 = position at sensor 2
subscript "d" refers to the drive component and "c" to Coriolis component
Due to the anti-symmetry of the Mode 2 drive motion $$Yd2 = -Yd1 \tag{3}$$

Due to symmetry of the Coriolis force response $$Yc2 = Yc1 \tag{4}$$

Add and subtract (1) and (2) using (3) and (4) gives the result:

$$Y1 + Y2 = 2Yc1 \tag{5}$$

$$Y1 - Y2 = 2Yd1 \tag{6}$$

Repeating the same calculation and recognizing the same symmetry and anti-symmetry relationship for the velocity vectors, Vij, and acceleration vectors, Aij, the following results occur $$V1 + V2 = 2Vc1 \tag{7}$$

$$V1 - V2 = 2Vd1 \tag{7B}$$

$$A1 + A2 = 2Ac1 \tag{8}$$

$$A1 - A2 = 2Ad1 \tag{8B}$$

Simply expressed, these equations mean that both the drive and Coriolis response components can be measured by adding and subtracting the observed beam motion amplitudes.

If the drive component is assigned zero phase angle this gives $$yd1 = y1dm * \sin(wt) \tag{9}$$

where
yd1 = current amplitude component at sensor 1
yd1m = maximum amplitude at sensor 1
w = drive frequency
t = time $$vd1 = yd1m * w * \cos(wt) \tag{10}$$

vd1 = current velocity at sensor 1

$$ad1 = -yd1m * w * w * \sin(wt) \tag{11}$$

ad1 = current acceleration

The Coriolis force at any point on the structure is proportional to mass flow rate and angular velocity introduced by the drive at that point. However, the angular velocity at sensor 1 (or any other point) is proportional to vd1 because the system is described by linear differential equations describing stationary periodic motion.

The aggregate of all Coriolis forces within the structure introduce a dynamic response at sensor 1 which is also proportional to vd1. This is true because this response is also controlled by a linear, dynamic relationship. Therefore $$yc1 = C * F * vd1 = C * F * yd1m * w * \cos(wt + \theta) \tag{12}$$

where
C = constant
F = mass flow rate
yc1 = current position of the Coriolis induced motion component
$\theta$ = phase-shift caused by structure inertia and friction factors $$vc1 = -C * F * yd1m * w * w * \sin(wt + \theta) \tag{13}$$

where
vc1 = current velocity of the Coriolis induced motion component

Note that the only observable variables are y1, y2, v1, v2, a1 and a2, which are the time functions corresponding to the vectors Y1, Y2, V1, V2, A1, and A2, respectively. Also note we have no knowledge of the phase angle, $\theta$. However, if the periodic signals y1 and y2 are added electronically and demodulated, the output of the demodulator will be:

$$\text{Peak}(y1 + y2) = \text{Peak}(2 * yc1) = 2C * F + yd1m * w \tag{14}$$

where Peak( ) indicates demodulator action

We now electronically subtract the periodic signals v1 and v2 and demodulate the difference. The result is $$\text{Peak}(v1 - v2) = \text{Peak}(2 * vd1) = 2 * yd1m * w \tag{15}$$

Dividing (14) with (15) and solving for F gives:

$$F = [\text{Peak}(y1 + y2) / \text{Peak}(v1 - v2)] / 2C. \tag{16}$$

This result is extremely important because both drive amplitude represented by yd1m and the drive frequency, w, cancelled out in the last operation. In other words the circuit outlined through this procedure furnishes a measure of mass flow which is completely and fundamentally independent of both drive amplitude and frequency. This is the ideal solution. Furthermore no reliance is made that the phase angle, $\theta$, which depends on complicated factors, remains constant.

One can similarly conclude by similar analysis that this alternative circuit algorithm also is valid:

$$F = [\text{Peak}(v1 + v2) / \text{Peak}(a1 - a2)] / 2C. \tag{17}$$

Figure 10C:
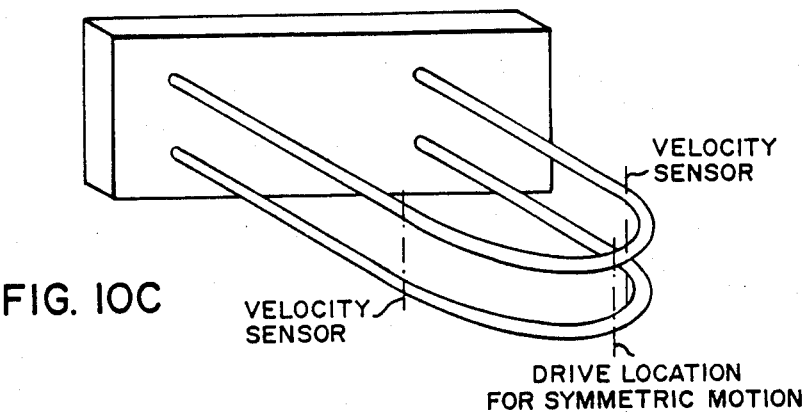
FIG. 10C is an elevational view of an alternative double tube Coriolis flowmeter of the invention.

The circuit implementation of equation (16) is shown in FIG. 10. Two velocity sensors 101 and 102 mounted symmetrically around the flow tube center as shown in FIG. 9 provide velocity signals, V1 and V2 to the summing amplifier 103 and the differential amplifier 104. The periodic signal V1+V2 is fed to an integrating amplifier 105 which converts the velocity difference to a position difference, Y1+Y2. Note that this integrator could also be a low-pass filter since only integration seen at the drive frequency is necessary. The low frequency behavior is immaterial. Drift in the integrator is also of no harm since the following circuit is an electronic demodulator 106, which extracts the peak amplitude, Y+, regardless of DC bias. The V1−V2 signal is fed to another demodulator 107 which delivers a DC output signal, V−, equal to the peak amplitude of its input signal. The DC signal Y+ is divided by the DC signal V− in the dividing circuit 108. The dividing circuit may be analog or digital. If digital it would have an analog to digital conversion circuit (not shown) serving each input.

An alternative digital design uses a voltage-to-frequency converter following the demodulators in each channel. By counting the number of cycles in the Y+ channel in FIG. 10a over a fixed number of cycles in the V− channel, the desired ratio is determined. The count of the counter represents the mass flow rate.

The output from the dividing circuit is proportional to the mass flow rate. All the circuit elements shown are readily available and well known to those of skill in electronics.

The circuit of FIG. 10 is simple and economical to produce. The requirements of this invention upon linearity of the velocity sensors is relatively mild in spite of the fact that the method is analog. The circuit uses the peak values extracted by demodulators. By proper demodulation technique only the peak values count which represents values only around zero (position) amplitude and maximum amplitude. The intermediate values do not count. The velocity sensors need linearity only in small domains around zero and maximum position amplitude which is easy to satisfy. Overall nonlinearity of the sensors will be calibrated out for example by a null adjustment.

The use of moderately high frequencies like 2062 rad/second in the above example makes the signal transmission very favorable. It also permits the demodulators to perform averaging over a large number of cycles without sacrifice of the flowmeter response time.

Acceleration sensors can replace the velocity sensors shown in FIG. 10. The circuit will then implement equation (17) instead of (16).

The circuitry described above has not been disclosed previously with respect to mass flowmeter. However, the relationship defined by (5) and (6) have been used by Sipin (see previously cited U.S. patents) on his structures with opposite symmetry (Mode 1 drive). Sipin used a velocity sum for control of amplitude and velocity difference as a linear measure of flow rate. The measurement accuracy will be directly dependent upon frequency stability of the drive and frequency shifts which may occur for many reasons will pose a major problem. Sipin's method also make the flowmeter accuracy proportionally dependent upon the accuracy of the amplitude control. Even with regulation it is difficult to obtain as high control accuracy of the amplitude as one typically wants to achieve with a Coriolis flowmeter.

In contrast, the present invention based upon the circuit embodiment of (16) and (17) requires no precise control of either frequency or amplitude because the position/velocity or velocity/acceleration ratio is independent of these variables.

The circuit embodiment associated with equations (16) and (17) and FIGS. 9 and 10 is the preferred embodiment of the signal processing means for this invention. However, the principle and implementation of Mode 2 drive for straight tube Coriolis flowmeters permit another simple and economical analog method for signal detection and processing.

Figure 11:
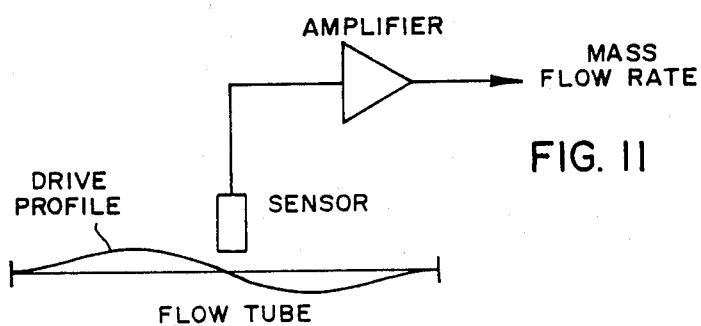
FIG. 11 is a diagram of an alternative circuit for processing the signals generated by the sensors.

This alternative embodiment uses a single velocity, position, or acceleration sensor located precisely at the center of the flow tube. With reference to FIG. 9, which shows the relative amplitude distribution of the drive marked 114, with peak amplitudes designated 115 and 116 it is clear that a sensor in the central location will not be influenced by the drive motion. However, the amplitude distribution for the deflection pattern induced by Coriolis forces has a maximum in the center, 117. This embodiment thus eliminates the complication of separation of drive motion from response motion. This method will be sensitive to both amplitude and frequency unless these variables are compensated for by measurement and computation, or alternatively precise regulation. The enbodiment is most attractive as a low-cost simple mass flowmeter where a rugged, obstacle-free path through the meter is desirable and medium or low accuracy of a mass flow rate measurement is desired. FIG. 11 shows the circuit for this embodiment.

The circuit in FIG. 10 can be applied with great advantage to many other flow tube configurations such as the dual flow tube design in FIG. 7. Sensors placed symmetrically with respect to the flow tube midpoint such as the positions marked 75 and 76 may be used as the sensors in FIG. 10 without other change. (Note that FIG. 7 represents a flowmeter driven at the second mode resonance frequency.) The circuit in FIG. 10 can be used with any anti-symmetric drive form.

An almost identical analysis of symmetrically driven flow tubes, which represents all prior art known to applicant, will lead to the following equations similar to (16) and (17):

$$F = [\text{Peak}(y1 - y2)/\text{Peak}(v1 + v2)]/2C \quad (18)$$

$$F = [\text{Peak}(v1 - v2)/\text{Peak}(a1 + a2)]/2C \quad (19)$$

Part B of FIG. 10 shows a circuit for such a symmetric drive. Amplifier 103 in that case subtracts V2 from V1 and amplifier 104 adds V1 and V2 to form the variables Y— and V+ as shown.

For a straight flow tube driven at Mode 1 resonance frequency the sensors should be placed symmetrically with respect to the flow tube midpoint and near the second mode extreme points as shown in FIG. 9 at 115, 116. The signals from these sensors are used in the circuit in part B of FIG. 10. The alternative circuit of part B of FIG. 10 is usable for the following flow tube configurations:

Single straight uniform or nonuniform flow tube driven at the resonance frequency of mode 1, 3, 5 or any odd number mode.

Double straight uniform or non-uniform flow tubes driven at the resonance frequency of mode 1, 3, 5 or any odd number mode.

Slightly curved double flow tubes such as those sold by Danfoss driven in Mode 1.

Single or double U tube configurations such as disclosed in the Smith U.S. Pat. Nos. 4,422,338 and 4,491,025 and shown in the double flow tube configuration shown in FIG. 10C. Sensors and drive mechanisms will function exactly as they do in the related commercial products but the velocity sensor signals are transmitted into the circuit in part B of FIG. 10, corresponding to equation (18).

Single or double helix configurations as disclosed in U.S. Ser. Nos. 775,739 and 777,707. All sensors and drive remain intact and at the same locations as used in the related commercial products. The velocity signals are fed into the circuit in part B of FIG. 10.

The single of double tube embodiments presented in U.S. Pat. No. 4,559,833 which use velocity sensors. The signals produced in the disclosed design can be fed directly into the circuit in part B of FIG. 10.

Position and acceleration sensors can also be used replacing the velocity sensors shown in FIG. 10 both for anti-symmetric and symmetric drive versions of the flowmeter.

E. Acoustic Wave Suppressor

Acoustic waves can cause problems for Coriolis flowmeters. These waves are sometimes called water-hammer because their manifestation can clearly be heard when strong. Nonaudible longitudinal acoustic waves are present in industrial liquid filled pipes whenever a pump operates in the line. Valve operations, wind vibrations and many sources create these waves. Normally a Coriolis flowmeter would not be affected because the motion dynamics have very small bandwidth for vibrating disturbance acceptance (due to low damping). In some piping systems the wave effects are represented by standing waves.

If the frequency of a standing acoustic wave happens accidentally to fall within the acceptance band of either the drive mode or the response mode for the flowmeter calibration, problems are likely to occur. Or if very strong and frequency random acoustic waves occur, problems may still arise because many Coriolis flowmeters have a recovery time of 5 seconds or more. During that time the instrument is not serving its purpose which may be control.

One important source of acoustic waves is the drive motion in the Coriolis flowmeter. The frequency is by definition in the drive mode acceptance band. It is not possible to prevent these waves from emitting from the flowmeter, but one does not want them to reflect back.

Figure 12:
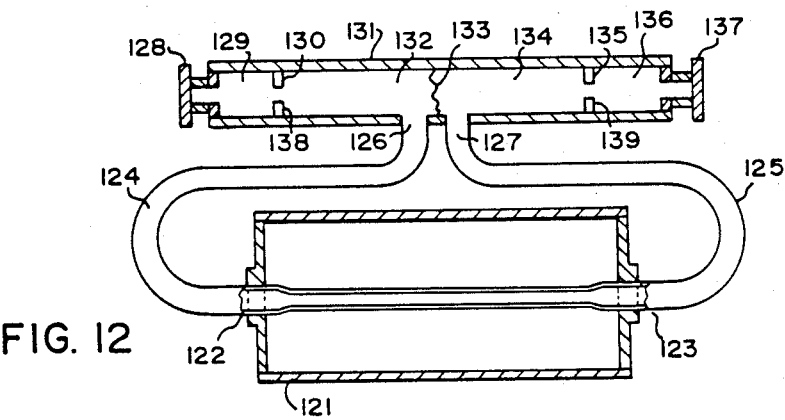
FIG. 12 is an elevational, sectional view of a Coriolis flowmeter equipped with an acoustic wave suppressor device.

The following describes a wave suppressor device that protects Coriolis flowmeters from the adverse effects of acoustic waves. The device can be used with any type of Coriolis flowmeter. The preferred embodiment is shown in FIG. 12. A Coriolis flowmeter is symbolically shown at 121. Conduits 124 and 125 which are at least as large in cross-sectional area as the flow tube (larger if parallel tubes are used) are attached to the ends of the flowmeter at 122 and 123 and connect the flowmeter to a wave suppressor device seen between 128 and 137. The latter numbers designate flanges connecting to the fluid inlet and outlet pipes to the device. The wave suppressor has four chambers 129, 132, 134, and 136. The two central chambers are separated by a flexible diaphragm 133.

The conduits 124 and 125 connect to the wave suppressor at 126 and 127, respectively. These connection points are within a distance of one or two conduit diameters from the diaphragm 133. This diaphragm will, of course, not be exposed to the full static pressure of the fluid, only the differential pressure of the flowmeter. It is possible, therefore, to make the diaphragm many orders of magnitude more flexible than pipes and conduits which must withstand the full static pressure.

The purpose of the diaphragm is to let the acoustic waves (which are longitudinal in the pipe and wave suppressor) go through the diaphragm which offers very low resistance to these waves. From a transient wave standpoint the fluid in the vicinity of the diaphragm will be at nearly zero pressure differential. The steady state pressure differential does not cause any problem for the flowmeter. Therefore, the conduits to the flowmeter will see nearly zero transient pressure differential and only a minimum of transient wave.

Other aspects in the wave suppressor beside the diaphragm perform useful wave attenuating functions. The right angle connection of conduits 124 and 125 to the relatively large chambers 132 and 134 creates a turbulent flow which suppresses waves. Additional suppression is created by the orifices 130 and 135 formed by the transverse wall members 138 and 139. In accordance with the need of a particular application smaller or larger orifices could be used or none at all (in the latter case there would be no separate chambers 129 and 136). The smaller orifice will suppress incoming waves more effectively. The fluid expansion between the flanges 128 and 137 and the smaller chambers 129 and 136 also creates wave reflection and attenuation points.

Acoustic waves generated by the drive vibration will propagate into the wave suppressor but energy losses there will highly reduce the reflection of these waves and reduce the amplitude or returning waves.

For a double tube Coriolis flowmeter the best junction point for the inlet and outlet fluid is by the diaphragm. As an alternative embodiment of this invention two conduits go to the flowmeter on each side of the diaphragm for such flowmeters. This arrangement will reduce circulating waves going from one tube to another.

Figure 13:
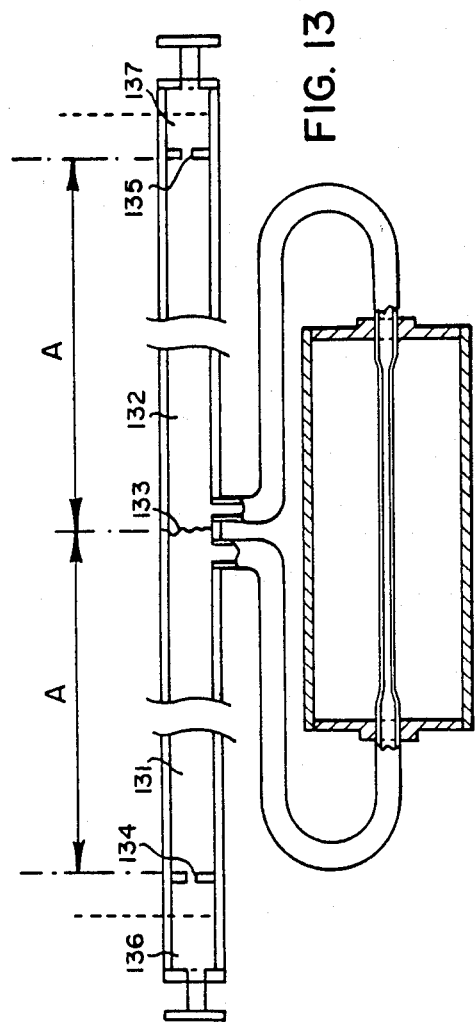
FIGS. 13 and 14 are elevational, sectional views of the meter of FIG. 12 equipped with alternative embodiments of the acoustic wave suppressor device.
Figure 14:
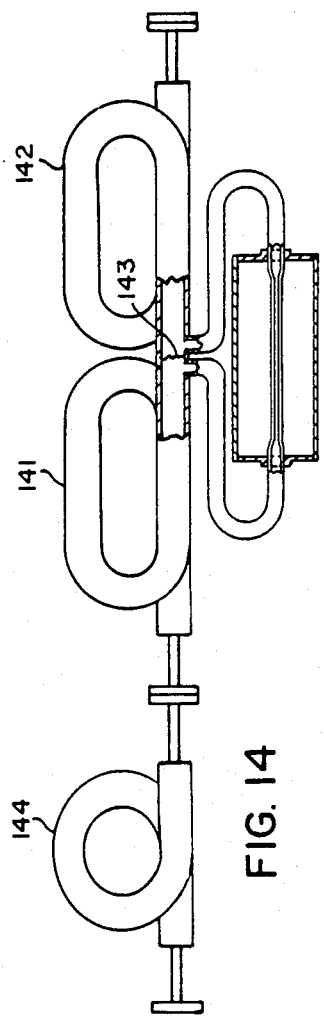

FIGS. 13 and 14 show embodiments of the wave suppressor with expanded capability, but also requiring much more space. In FIG. 13 the chambers 131 and 132 on either side of the diaphragm 133 have been constructed to create a resonant system with a node for a desired wavelength at the diaphragm. In order to accomplish that the length A on each side is chosen to be one quarter of the wavelength. A wave propagating from the diaphragm will, after reflection at the end of the chamber 131 or 132, reflect back and arrive exactly in opposite phase with a new emerging wave and cancel it. Thus if a troublesome frequency, such as the drive frequency, needs to be almost completely attenuated one needs only to "tune" the chambers 131 and 132 by the above described "quarter wavelength principle".

Consider an example with water as fluid. The wave velocity in the chambers 131 and 132 (or any other conduit) is given by the formula:

$$Vc = V * \sqrt{1/[1+(D*E)/(T*Ec)]}$$

where
Vc = velocity in conduit
V = velocity in unrestricted medium (1500 meter/sec)
D = inside diameter
E = bulk modulus for fluid
Ec = tube wall Bulk mod.
t = tube wall thickness In a stainless steel conduit with 5 centimeters inside diameter and 3 millimeters wall thickness the wave velocity will be 1380 meters/second. (Bulk modulus for water is 305,000 psi and stainless steel 28,000,000 psi).

The wave length at a chosen frequency, f, is given by $$WL = Vc/f$$

Thus in order to the chambers 131 and 132 to suppress 2062 rad/sec = 328.2 hertz using the 5 cm tubing requires a length of "A" in FIG. 13:

$$A = 0.25 * 1380/328.2 = 1.05 \text{ meter.}$$

A wave suppressor chamber may be too sharply tuned and thereby loose effectiveness when the disturbing acoustic frequency changes. The orifices 134 and 135 in FIG. 13 will broaden the bandwidth since the waves will propagate partially through the chambers 136 and 137 as well making the frequency for node formation at the diaphragm lower. Friction losses in the orifices 134 and 135 will further broaden the bandwidth of the attenuation.

The total length of this wave suppressor of FIG. 13 is over 2 meters. The embodiment in FIG. 14 reduces the length. It is made of two loops 141 and 142. The waves follow the loop bends but not without dispersion which relates to bending radius/wave length ratio. Beside the two loops next to the center diaphragm 143, FIG. 14 shows a series connected loop 144 which is tuned to a different frequency. It could for example be made quarter-wavelength long at the pulsing frequency of a particular pump which happens to coincide with a sensitive frequency in the flowmeter. By the teaching of this invention it can be seen that one can readily determine the design parameters. Standard consideration of wave suppressor wall pressure rating must, of course, be taken into account.

Modifications of the above described modes for carrying out the invention that are obvious to those of skill in the fields of engineering mechanics, fluid dynamics, and flow measurement, in particular, are intended to be within the scope of the following claims.

I claim:

1. An acoustic wave suppressor for use with a Coriolis flowmeter comprising:
   (a) an elongated tube having a fluid inlet end and a fluid outlet end;
   (b) a flexible diaphragm mounted generally centrally and transversely at only at a perimeter thereof within the tube that divides the interior of the tube into an inlet end chamber and an outlet end chamber;
   (c) a first conduit, one end of which connects at an angle of at least 90° to the inlet end chamber proximate to the diaphragm and the other end of which connects to the flowmeter inlet; and
   (d) a second conduit, one end of which connects to the flowmeter outlet and the other end of which connects at an angle of at least 90° to the outlet end chamber proximate to the diaphragm, said inlet end chamber and outlet end chamber having substantially greater cross-sectional areas than the first conduit and the second conduit.

2. An acoustic wave suppressor for use with a Coriolis flowmeter comprising:
   (a) an elongated tube having a fluid inlet end and a fluid outlet end;
   (b) a flexible diaphragm mounted generally centrally and transversely within the tube that divides the interior of the tube into an inlet end chamber and an outlet end chamber;
   (c) a first conduit, one end of which connects to the inlet end chamber proximate to the diaphragm and the other end of which connects to the flowmeter inlet; and
   (d) a second conduit, one end of which connects to the flowmeter outlet and the other end of which connects to the outlet end chamber proximate to the diaphragm, said inlet end chamber and outlet end chamber having substantially greater cross-sectional areas than the first conduit and the second conduit;
   wherein each of said inlet end chamber and said outlet end chamber is divided into two subchambers by a transverse wall having an orifice to permit fluid to pass therethrough.

3. An acoustic wave suppressor for use with a Coriolis flowmeter comprising:
   (a) an elongated tube having a fluid inlet end and a fluid outlet end;
   (b) a flexible diaphragm mounted generally centrally and transversely within the tube that divides the interior of the tube into an inlet end chamber and an outlet end chamber;
   (c) a first conduit, one end of which connects to the inlet end chamber proximate to the diaphragm and the other end of which connects to the flowmeter inlet; and
   (d) a second conduit, one end of which connects to the flowmeter outlet and the other end of which connects to the outlet end chamber proximate to the diaphragm, said inlet end chamber and outlet end chamber having substantially greater cross-sectional areas than the first conduit and the second conduit;
   wherein the length of each of said inlet end chamber and outlet end chamber is one-quarter of the wavelength of the frequency of the acoustic wave that is to be suppressed.

4. The acoustic wave suppressor of claim 1 wherein said tube is straight.

5. An acoustic wave suppressor for use with a Coriolis flowmeter comprising:
   (a) an elongated tube having a fluid inlet end and a fluid outlet end;
   (b) a flexible diaphragm mounted generally centrally and transversely within the tube that divides the interior of the tube into an inlet end chamber and an outlet end chamber;
   (c) a first conduit, one end of which connects to the inlet end chamber proximate to the diaphragm and the other end of which connects to the flowmeter inlet; and
   (d) a second conduit, one end of which connects to the flowmeter outlet and the other end of which connects to the outlet end chamber proximate to the diaphragm, said inlet end chamber and outlet end chamber having substantially greater cross-sectional areas than the first conduit and the second conduit;
   wherein each of said inlet end chamber and said outlet end chamber forms a loop, whereby the linear length of the suppressor is reduced.

* * * * *